(12) United States Patent
Sakata (10) Patent No.: US 8,678,435 B2
(45) Date of Patent: Mar. 25, 2014

(54) STEERING COLUMN DEVICE

(75) Inventor: Toru Sakata, Kosai (JP)

(73) Assignee: Fuji Kiko Co., Ltd., Kosai-shi, Shizuoka-ken (JP)

( * ) Notice: Subject to any disclaimer, the term of this patent is extended or adjusted under 35 U.S.C. 154(b) by 265 days.

(21) Appl. No.: 13/012,430

(22) Filed: Jan. 24, 2011

(65) Prior Publication Data

US 2011/0187089 A1 Aug. 4, 2011

(30) Foreign Application Priority Data

Feb. 2, 2010 (JP) ................................ P2010-021531

(51) Int. Cl.
*B62D 1/18* (2006.01)
*B62D 1/184* (2006.01)
*B62D 1/185* (2006.01)

(52) U.S. Cl.
CPC ...... *B62D 1/18* (2013.01); *B62D 1/184* (2013.01); *B62D 1/185* (2013.01)
USPC .............................. 280/775; 280/779; 74/493

(58) Field of Classification Search
USPC ...................... 280/775, 779; 74/493
See application file for complete search history.

(56) References Cited

U.S. PATENT DOCUMENTS

| | | | | |
|---|---|---|---|---|
| 1,623,493 | A | * | 4/1927 | Postlethwait ............... 74/493 |
| 4,240,305 | A | * | 12/1980 | Denaldi et al. ............ 74/493 |
| 5,607,184 | A | * | 3/1997 | Barton .................... 280/775 |
| 5,787,759 | A | * | 8/1998 | Olgren ..................... 74/493 |
| 6,467,807 | B2 | * | 10/2002 | Ikeda et al. .............. 280/775 |
| 7,097,205 | B2 | * | 8/2006 | Camp et al. ............... 280/775 |
| 7,228,754 | B2 | * | 6/2007 | Matsumiya ................ 74/493 |
| 7,434,841 | B2 | * | 10/2008 | Camp ..................... 280/777 |

(Continued)

FOREIGN PATENT DOCUMENTS

| | | | |
|---|---|---|---|
| EP | 2 223 842 | * | 1/2010 |
| JP | 2005-047487 A | | 2/2005 |
| JP | 2007-223383 A | | 9/2007 |
| JP | 2008-143396 A | | 6/2008 |
| JP | 2009-83827 A | | 4/2009 |
| JP | 2009-286341 A2 | | 12/2009 |
| JP | 2011-037357 | * | 2/2011 |
| JP | 5230548 B2 | | 3/2013 |
| WO | 20061011378 A1 | | 2/2006 |
| WO | 2009/138578 A1 | | 11/2009 |

OTHER PUBLICATIONS

Office Action issued on Jul. 18, 2013 in the counterpart Japanese Application No. 2010-021531, with English Abstract, five pages.

*Primary Examiner* — Ruth Ilan
*Assistant Examiner* — George Spisich
(74) *Attorney, Agent, or Firm* — Nath, Goldberg & Meyer; Jerald L. Meyer; Stanley N. Protigal (57) ABSTRACT

A steering column device includes: a bracket to be fixed to a vehicle body and including a first wall; a steering shaft; a steering column including one end supported by the vehicle body and an outer peripheral surface with a second wall, and configured to rotatably support the steering shaft; and a clamp shaft penetrating the first wall and configured to switch between a pressure and non-pressure contact states respectively where the first and second walls are and are not in pressure contact with each other. The first and second walls include: a pair of first protrusions disposed separately on both sides of the clamp shaft in a first direction parallel to an axial direction of the steering column, and extending in a second direction perpendicular to the axial direction of the steering column; and a pair of second protrusions disposed separately in the second direction and extending in the first direction. Each of the first protrusions contacts both of the second protrusions in the pressure contact state.

5 Claims, 12 Drawing Sheets

(56) References Cited

U.S. PATENT DOCUMENTS

| | | |
|---|---|---|
| 7,886,631 B2 * | 2/2011 | Nashef et al. ............... 74/493 |
| 8,186,242 B2 * | 5/2012 | Uesaka ....................... 74/493 |
| 2003/0172765 A1 * | 9/2003 | Heiml ......................... 74/493 |
| 2005/0178231 A1 * | 8/2005 | Schick et al. ................ 74/493 |
| 2011/0259140 A1 * | 10/2011 | Fevre .......................... 74/493 |

\* cited by examiner

STEERING COLUMN DEVICE

CROSS REFERENCE TO RELATED APPLICATION

This application is based upon and claims the benefit of priority from the prior Japanese Patent Application No. 2010-021531, filed on Feb. 2, 2010, the entire contents of which are incorporated herein by reference.

BACKGROUND OF THE INVENTION

1. Field of the Invention

The present invention relates to a steering column device incorporating a steering shaft capable of a tilt operation and a telescopic operation of a steering wheel.

2. Description of the Related Art

Some of steering wheels of automobiles are each capable of a tilt operation and a telescopic operation to respectively adjust the vertical position and the anteroposterior position of the steering wheel according to a driver's physical constitution. The vertical position and the anteroposterior position of the steering wheel thus adjusted are fixed by a supporting device with which a steering column for housing a steering shaft is supported onto a vehicle body side.

This supporting device includes a vehicle-body-side bracket having a fixed longitudinal wall portion disposed at a right or left side of the steering column, and a movable longitudinal wall portion provided on an outer tube to be movable relative to the fixed longitudinal wall portion in directions of a tilt operation and a telescopic operation. When an operation lever is operated, a clamping force generated by a clamp shaft brings the fixed longitudinal wall portion and the movable longitudinal wall into pressure contact with each other, and thereby the steering column is fixed. The fixation of the steering column is discontinued by releasing the pressure contact.

In other words, when the steering column is fixed by using the supporting device, relative movement of the fixed longitudinal wall portion and the movable longitudinal wall portion is prevented by friction resistance caused by the pressure contact of both of the wall portions. Here, it is difficult to ensure flat surfaces of both of the fixed longitudinal wall portion and the movable longitudinal wall portion because members of these two wall portions may be distorted. For this reason, the two wall portions may contact each other at unintended regions. If the two wall portions contact each other in the unintended regions, contact between the fixed longitudinal wall portion and the movable longitudinal wall portion is unstable. Such unstable contact has a risk of obtaining insufficient support stiffness. Moreover, resonance frequencies may vary among the vehicle body, the steering wheel and other components located therebetween. In this case, without obtaining a desired resonance frequency, the steering wheel may vibrate by resonating with the vehicle body during idling.

In this regard, Japanese Unexamined Patent Application Publication No. 2007-223383 proposes a supporting device in which upper and lower protrusions each extending in an axial direction of a steering column are formed on an outer side surface of a movable longitudinal wall portion to contact with a fixed longitudinal wall portion, and in which the movable longitudinal wall portion and the fixed longitudinal wall portion are brought into stable pressure contact with each other by use of the upper and lower protrusions.

SUMMARY OF THE INVENTION

In the steering column device disclosed in Japanese Unexamined Patent Application Publication No. 2007-223383, the upper and lower protrusions of the movable longitudinal wall portion are proactively brought into contact with the fixed longitudinal wall portion. However, the pressure contact in the axial direction of the steering column highly depends on flatness of the upper and lower protrusions in the axial direction and on planarity of the fixed longitudinal wall portion. For this reason, the pressure contact in the axial direction of the steering column is largely influenced by dimensional dispersion at the formation or material distortions of the upper and lower protrusions and the fixed longitudinal wall portion. Accordingly, insufficient support stiffness may be obtained when the contact between the fixed longitudinal wall portion and the movable longitudinal wall portion is unstable. Or, the resonance frequency may vary depending on a position of a telescopic operation, and thereby the steering wheel may vibrate by resonating with vibration of the vehicle body.

An object of the present invention is to provide a steering column device which is capable of achieving stable fixation when performing a clamping operation of an operation lever.

An aspect of the present invention is a steering column device comprising: a bracket including a fixed portion to be fixed to a vehicle body and a first wall extending downward from the fixed portion; a steering shaft having an upper end in an axial directional of the steering shaft for fixing a steering wheel; a steering column including one end supported by the vehicle body and an outer peripheral surface with a second wall, and configured to rotatably support the steering shaft inside the steering column; a clamp shaft penetrating the first wall, the clamp shaft being configured to switch between a pressure contact state where the first wall and the second wall are in pressure contact with each other and a non-pressure contact state where the first wall and the second wall are not in pressure contact with each other; a pair of first protrusions disposed on any one of the first wall and the second wall separately on both sides of the clamp shaft in a first direction parallel to an axial direction of the steering column, the pair of first protrusions extending in a second direction perpendicular to the axial direction of the steering column; and a pair of second protrusions disposed on the other one of the first wall and the second wall separately in the second direction and extending in the first direction, wherein each of the first protrusions contacts both of the second protrusions in the pressure contact state.

According to this aspect, the paired first protrusions being separately disposed in the first direction parallel to the axial direction of the steering column and extending in the second direction (the vertical direction relative to the vehicle body) perpendicular to the axial direction of the steering column are provided on any one of the first wall portion on the vehicle-body-side bracket and the second wall portion provided on the lower jacket. Meanwhile, the paired second protrusions being separately disposed in the second direction (the vertical direction relative to the vehicle body) and extending in the first direction are provided on the other one of the first wall portion and the second wall portion. Then, each of the paired first protrusions is proactively brought into contact with both of the second protrusions. This configuration always brings the first wall portion into stable contact with the second wall portion at the four contact portions on four corners, and thereby more reliably fixes the first wall portion to the second wall portion. In this way, it is possible to obtain sufficient support stiffness of the steering column and to achieve stable fixation.

Moreover, improvement in resonance frequency and elimination of variation in resonance frequency by enhancing the support stiffness makes it possible to prevent the steering wheel from resonating with vibration of the vehicle body.

The first wall may have a first elongated hole formed between the pair of first protrusions along a direction of tilt movement of the steering shaft, part of the clamp shaft may be located in the first elongated hole, and the clamp shaft may be adapted to move inside the first elongated hole in the non-pressure contact state.

According to this configuration, the first wall portion to the second wall portion can be more reliably fixed even when the tilt position adjustment mechanism is provided. Hence it is possible to obtain sufficient support stiffness of the steering column and to achieve stable fixation.

The steering column may comprise: an upper jacket configured to rotatably support the steering shaft inside a cylindrical inner portion of the upper jacket and including a second elongated hole formed along a direction of telescopic movement of the steering shaft; and a lower jacket configured to slidably support the upper jacket in the direction of telescopic movement of the steering shaft and to rotatably support the steering shaft together with the upper jacket, part of the clamp shaft may be located in the second elongated hole, the clamp shaft may be configured to penetrate the first wall and the second wall, adapted to move inside the second elongated hole in the non-pressure contact state, and configured to bring the first wall, the second wall, and the upper jacket into pressure contact with one another in the pressure contact state.

According to this configuration, the first wall portion and the second wall portion can be fixed to the upper jacket more reliably even when the telescopic position adjustment mechanism is provided. Hence it is possible to obtain sufficient support stiffness of the steering column and to achieve stable fixation.

The steering column device may comprise two contact portions out of four contact portions where the pair of first protrusions and the pair of second protrusions are in contact with each other in the pressure contact state, the two contact portions being located on a line parallel to an axial center line of the steering column while passing through an axial center of the clamp shaft.

According to this configuration, it is possible to achieve the effect similar to the above-described aspect.

The clamp shaft may be located at a center of four contact portions where the pair of first protrusions and the pair of second protrusions are in contact with each other in the pressure contact state.

According to this configuration, the clamp shaft is located in the center of the four contact portions. Hence it is possible to apply a clamping force from the clamp shaft substantially evenly to the respective contact portions and thereby to fix the steering column more stably.

DETAILED DESCRIPTION OF THE EMBODIMENTS

Now, embodiments of the present invention will be described in detail with reference to the accompanying drawings.

First Embodiment

Figure 1:
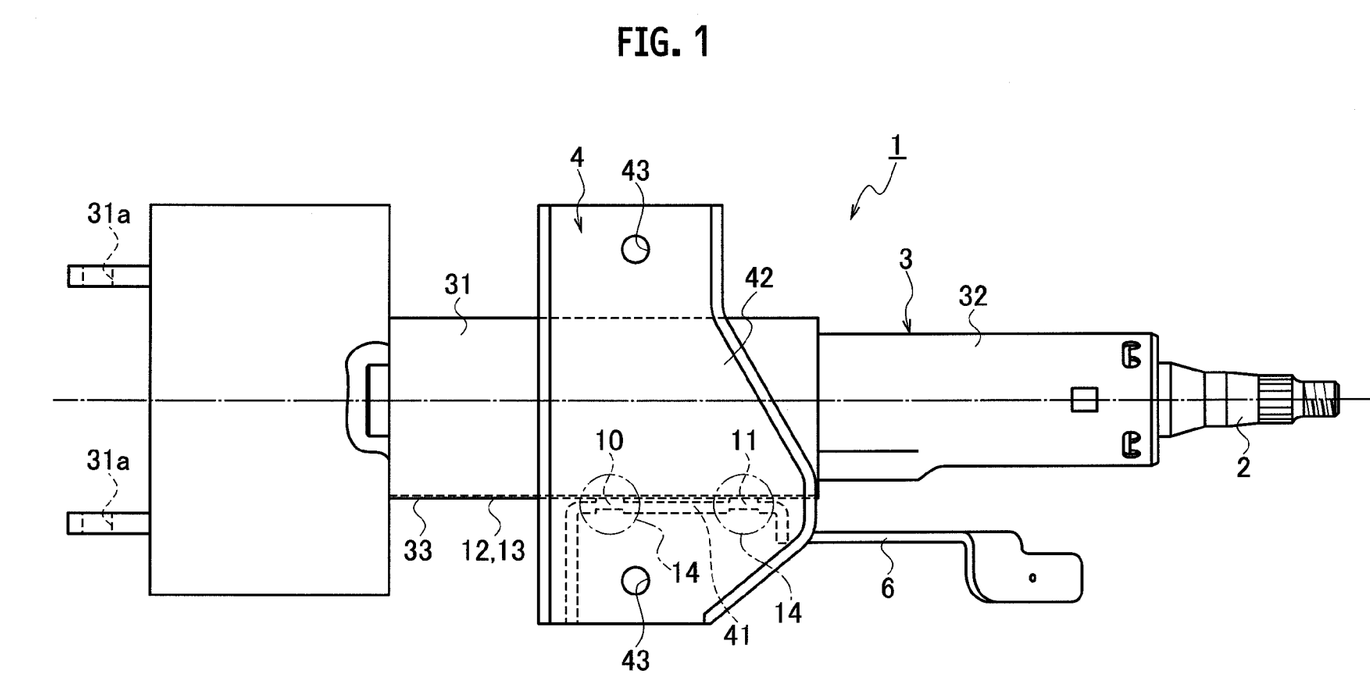
FIG. 1 is a plan view of a steering column device according to a first embodiment of the present invention.
Figure 2:
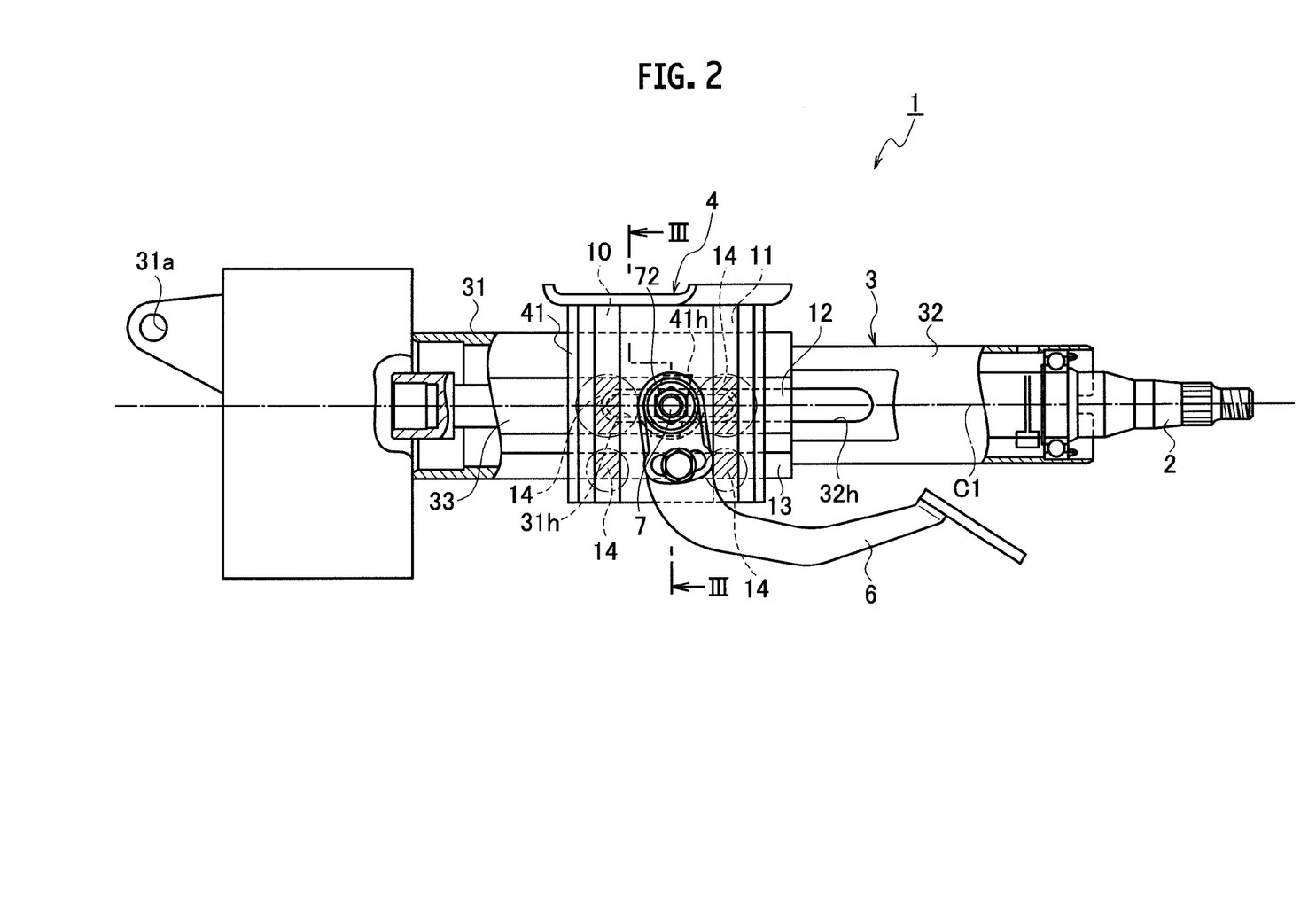
FIG. 2 is a side view of the steering column device according to the first embodiment of the present invention.
Figure 3:
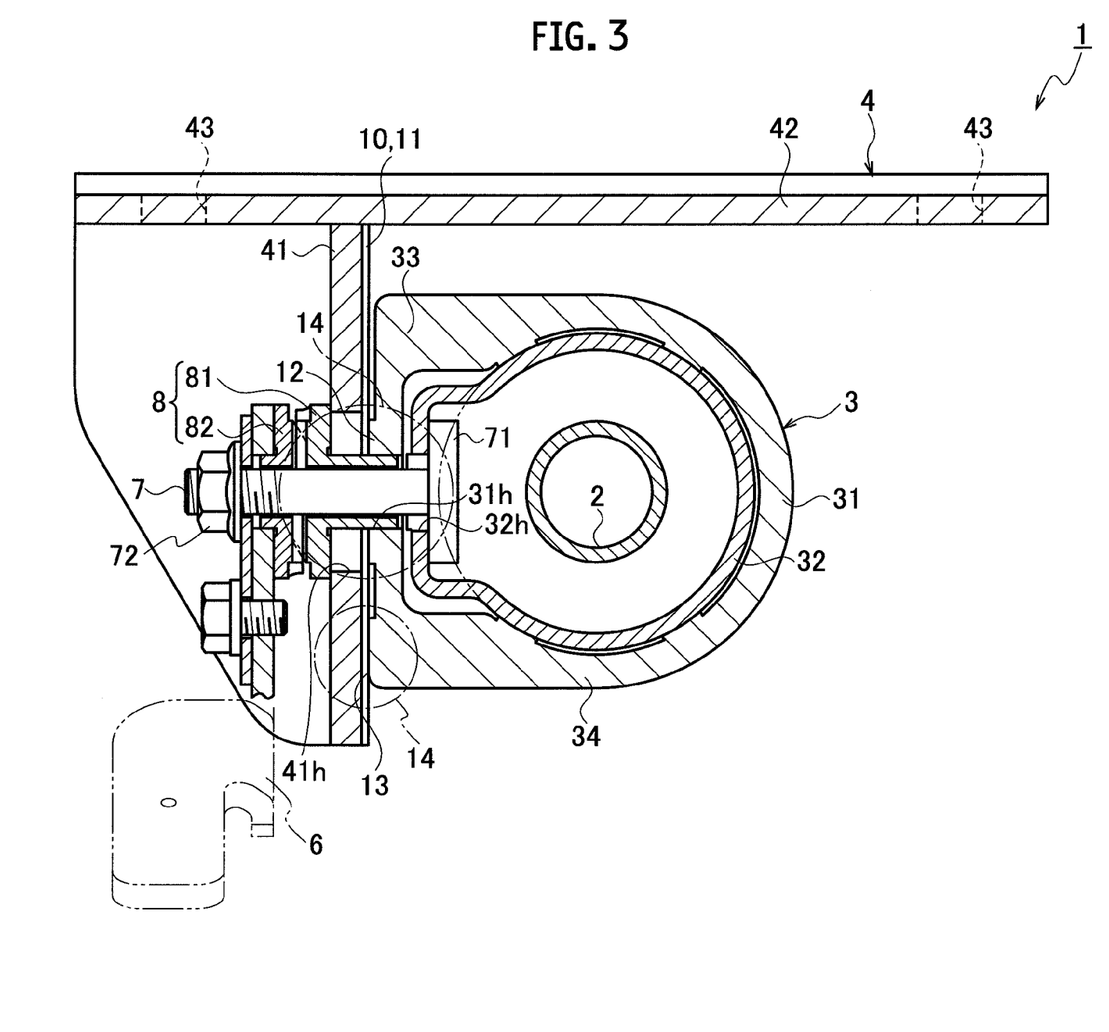
FIG. 3 is a cross-sectional view taken along the line in FIG. 2.

As shown in FIG. 1 to FIG. 3, a steering column device 1 of a first embodiment is configured to support a steering column 3 on a vehicle body side. Here, the steering column 3 houses a steering shaft 2 capable of performing a tilt operation and a telescopic operation of an unillustrated steering wheel. The steering column 3 includes a lower jacket 31 and an upper jacket 32 which are engaged with each other so as to be mutually movable in an axial direction. Overlapping portions of both of these jackets 31 and 32 are supported on the vehicle body side by a vehicle-body-side bracket 4.

The steering column device 1 generally includes the vehicle-body-side bracket 4, the steering column 3 (the lower jacket 31 and the upper jacket 32), and a clamp bolt 7, and is a cantilever type in which a fixed longitudinal wall portion (a first wall portion) 41 and a movable longitudinal wall portion (a second wall portion) 33 are provided on one side of the steering column 3.

The vehicle-body-side bracket 4 includes the fixed longitudinal wall portion 41 located on a left side, in a vehicle width direction, of the above-described overlapping portion of the steering column 3, and a vertically elongated hole (a first elongated hole) 41h formed on the fixed longitudinal wall portion in a direction of a tilt operation (movement) which is substantially equivalent to a vertical direction relative to a vehicle body. An upper side plate 42 serving as a fixing portion and having a T-shaped cross section is fixed to an upper end of the fixed longitudinal wall portion 41, whereby the vehicle-body-side bracket 4 is fixed to an unillustrated steering member located on the vehicle body side through fixation holes 43 provided on both ends, in the vehicle width direction, of the upper side plate 42 by use of bolts and the like.

In the lower jacket 31, a vehicle body support portion 31a illustrated on a right end in the drawing is supported by the vehicle body so as to be swingable in the direction of the tilt operation. The lower jacket 31 includes the movable longitudinal wall portion 33 which is movable in the direction of the tilt operation relative to the above-described fixed longitudinal wall portion 41 and which is configured to rotatably bear the steering shaft 2 inside a cylindrical inner portion. In the lower jacket 31, a support plate 34 having a U-shaped cross section and being configured to cover almost half of a circumference of the upper jacket 32 of the steering column 3 is integrally provided on both of upper and lower ends of the movable longitudinal wall portion 33.

The upper jacket 32 is slidably inserted from a left end in the drawing of the lower jacket 31 into the cylindrical inner portion in a direction of a telescopic operation and is configured to rotatably bear the steering shaft 2 in cooperation with the lower jacket 31. The upper jacket 32 is also provided with an anteroposteriorly elongated hole (a second elongated hole) 32h located in a region opposed to the vertically elongated hole 41h and in the direction of the telescopic operation (an axial direction of the steering column 3 and the steering shaft 2).

The clamp bolt 7 functions as a clamp shaft, which is inserted to the fixed longitudinal wall portion 41, the movable longitudinal wall portion 33, and the anteroposteriorly elongated hole 32h and is provided with an operation lever 6 on one end. The clamp bolt 7 is inserted to the vertically elongated hole 41h and the anteroposteriorly elongated hole 32h while penetrating a bolt hole 31h provided on the movable longitudinal wall portion 33. A flange 71 to be locked on an inner side of the movable longitudinal wall portion 33 is formed on an end of the clamp bolt 7 close to the steering column 3 (on the right side in FIG. 3). On the other hand, an opposite end (on the left side in FIG. 3) of the clamp bolt 7 protruding from the fixed longitudinal wall portion 41 is inserted to a cam portion 8 and the operation lever 6 in this order. These constituents are clamped and fixed by use of a nut 72.

The operation lever 6 is engaged in a noncircular fashion with a movable cam member 82 included in the cam portion 8 penetrated by the clamp bolt 7 and is integrally rotated in a direction of rotation thereof. The cam portion 8 includes a fixed cam member 81 prevented from relative rotation with respect to the vertically elongated hole 41h and the bolt hole 31h, and the movable cam member 82 to be rotated by operating the operation lever 6. A cam main body which is configured to increase or decrease a dimension between both of the cam members 81 and 82 by rotating operation of the operating lever 6 either in a clamping direction or an unclamping direction, i.e., positive or negative rotation of the movable cam member 82, is formed on opposed surfaces of the fixed cam member 81 and the movable cam member 82. Specifically, the dimension between both of the cam members 81 and 82 of the cam portion 8 is increased in a clamped state shown in FIG. 1 to FIG. 3. Meanwhile, the dimension between both of the cam members 81 and 82 is decreased in the unclamped state by performing the rotating operation of the operation lever 6 from the clamped state in an unclamping direction which is equivalent to a clockwise direction in FIG. 2.

Therefore, by operating the operation lever 6 in the clamping direction, a clamping force is applied to the clamp bolt 7 so as to press the upper jacket 32 and the movable longitudinal wall portion 33 of the lower jacket 31 between the flange 71 and the fixed longitudinal wall portion 41, thereby fixing the lower jacket 31 to the vehicle-body-side bracket 4. When performing the unclamping operation of the operation lever 6, the clamp bolt 7 moves inside the vertically elongated hole 41h together with the steering column 3. Hence it is possible to perform vertical tilting (the tilt operation) of the steering column 3. Moreover, as the anteroposteriorly elongated hole 32h of the upper jacket 32 moves relative to the clamp bolt 7, the lower jacket 31 and the upper jacket 32 relatively move in the axial direction while changing an axial length of the steering shaft 2. Hence it is possible to perform adjustment of a length in the axial direction (the telescopic operation) of the steering column 3.

Here, in this embodiment, one of the fixed longitudinal wall portion 41 and the movable longitudinal wall portion 33, i.e., the fixed longitudinal wall portion 41 is provided with paired vertical protrusion (first protrusions) 10 and 11 being disposed separately in the axial direction (the direction of the telescopic operation) of the steering column 3 and extending in the direction of the tilt operation (the vertical direction in FIG. 1). The other wall portion, i.e., the movable longitudinal wall portion 33 is provided with paired anteroposterior protrusion (second protrusions) 12 and 13 being disposed separately in the direction of the tilt operation and extending in the axial direction (the direction of the telescopic operation) of the steering column 3.

In this embodiment, the anteroposterior protrusion 12 is disposed on a center line C1 passing through the center of the clamp bolt 7 and extending in the axial direction of the steering column 3. The anteroposterior protrusion 13 is located in a position at a lower end of the movable vertical wall portion 33, i.e., a position to which the anteroposterior protrusion 12 is shifted downward in a direction perpendicular to the center line C1.

The vertical protrusions 10 and 11 and the anteroposterior protrusions 12 and 13 are formed such that each of the vertical protrusions 10 and 11 contacts the anteroposterior protrusions 12 and 13 within a range of the tilt operation and within a range of the telescopic operation.

Specifically, the vertical protrusions 10 and 11 are extended to contact the anteroposterior protrusion 12 and the anteroposterior protrusion 13, no matter where the clamp bolt 7 is located in a range from an upper end to a lower end of the vertically elongated hole 41h. Moreover, the anteroposterior protrusions 12 and 13 are extended to contact the vertical protrusion 10 and the vertical protrusion 11, no matter where the clamp bolt 7 is located in a range from a front end to a rear end of the anteroposteriorly elongated hole 32h. Accordingly, the fixed longitudinal wall portion 41 can contact the movable longitudinal wall portion 33 at four contact portions 14 located on four corners no matter where the steering wheel is fixed within a range covered by the tilt operation and the telescopic operation.

According to the above-described embodiment, the paired vertical protrusions 10 and 11 being separately disposed in the direction of the telescopic operation and extending in the direction of the tilt operation are provided on the fixed longitudinal wall portion 41 out of the fixed longitudinal wall portion 41 of the vehicle-body-side bracket 4 and the movable longitudinal wall portion 33 provided on the steering column 3. Meanwhile, the paired anteroposterior protrusions 12 and 13 being separately disposed in the direction of the tilt operation and extending in the direction of the telescopic operation are provided on the movable longitudinal wall portion 33. Moreover, the paired vertical protrusions 10 and 11 are brought into contact with the paired anteroposterior protrusions 12 and 13 within the range of the tilt operation and within the range of the telescopic operation. As a consequence, the fixed longitudinal wall portion 41 stably contacts the movable longitudinal wall portion 33 at the contact portions 14 located in four positions. Hence it is possible to more reliably fix the fixed longitudinal wall portion 41 to the movable longitudinal wall portion 33.

In this way, it is possible to obtain sufficient support stiffness and to fix the steering column 3 stably when the steering wheel is operated in the direction of the tilt operation or in the direction of the telescopic operation. Moreover, it is also possible to improve and stabilize the resonance frequency to prevent the steering wheel from resonating with vibration of the vehicle body.

Second Embodiment

Figure 4:
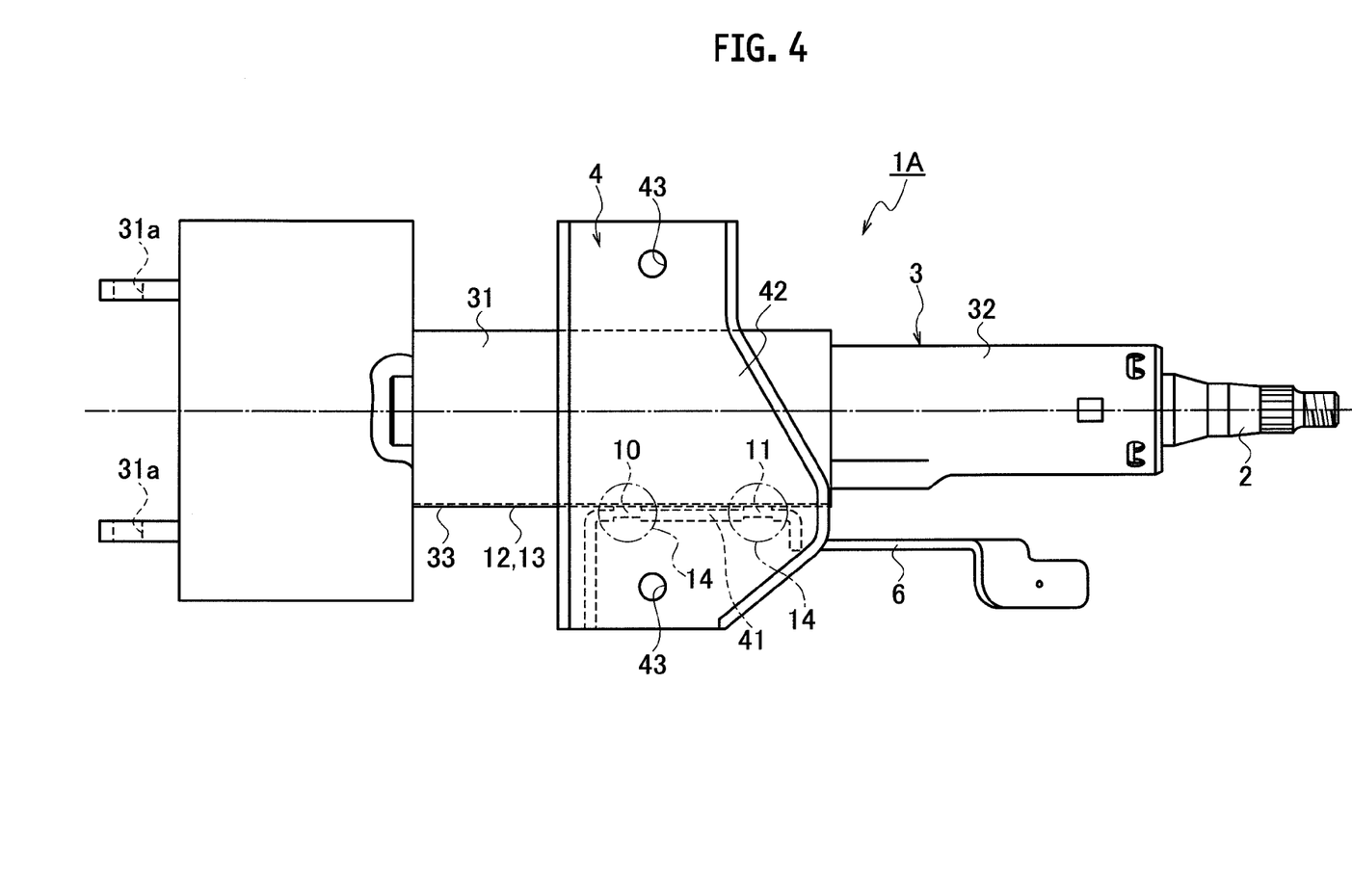
FIG. 4 is a plan view of a steering column device according to a second embodiment of the present invention.
Figure 5:
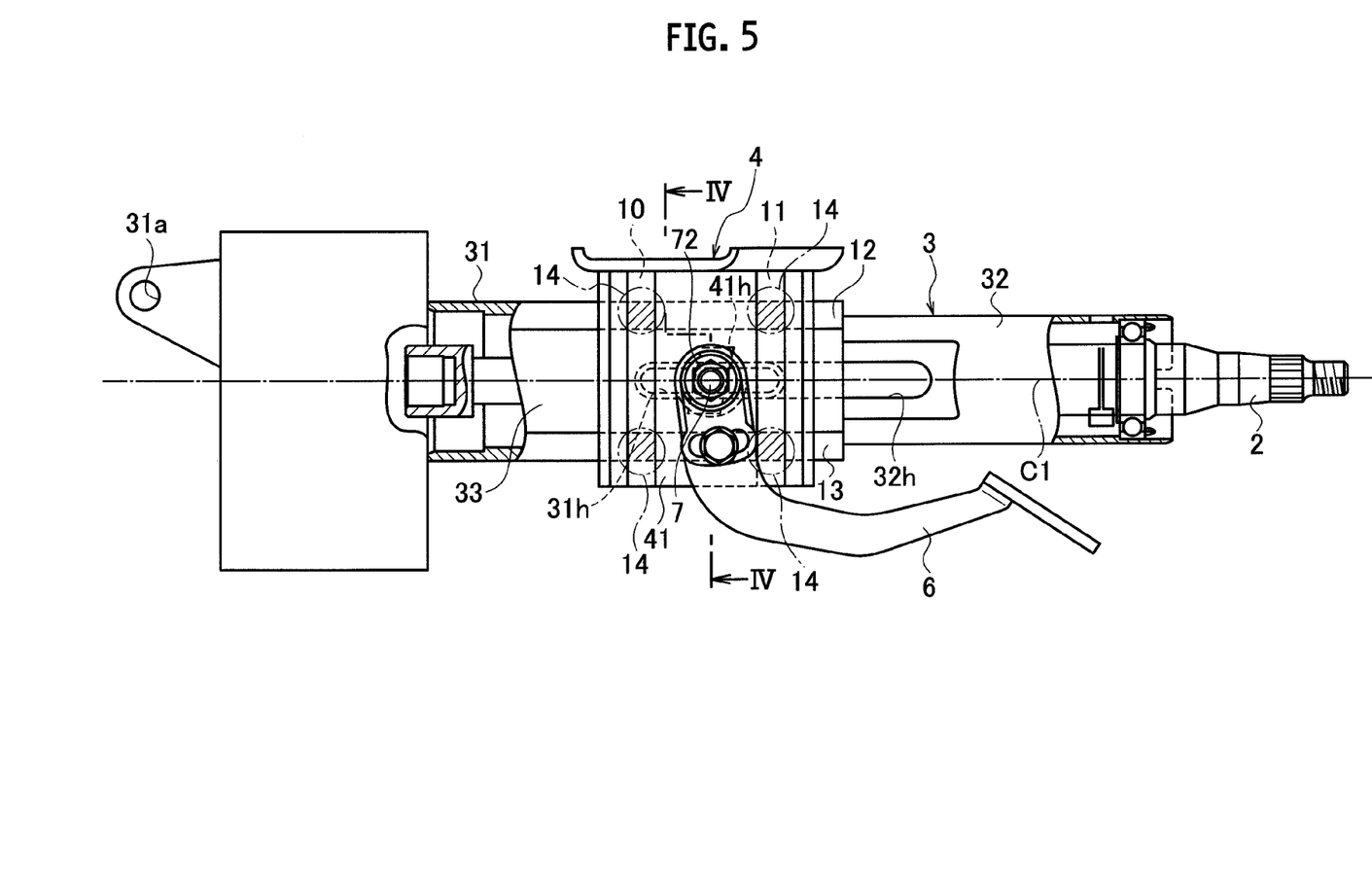
FIG. 5 is a side view of the steering column device according to the second embodiment of the present invention.
Figure 6:
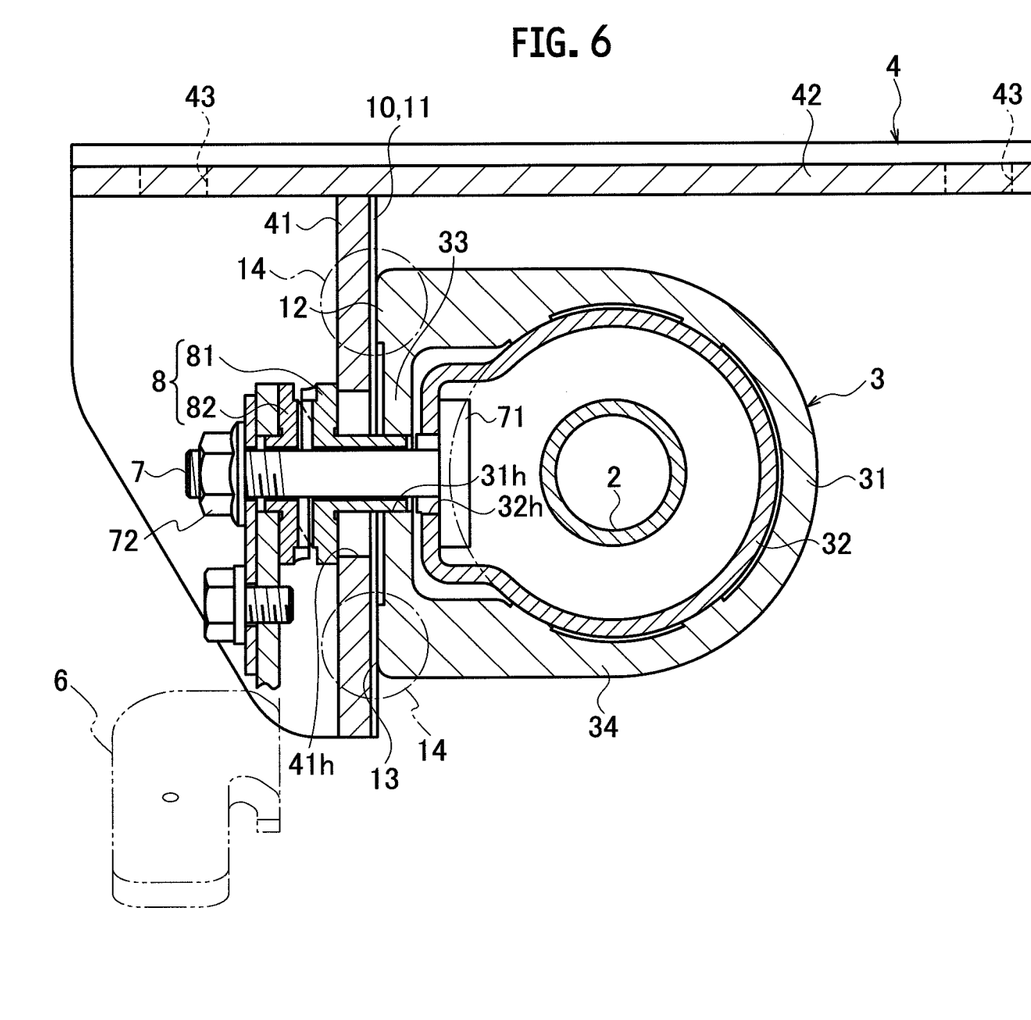
FIG. 6 is a cross-sectional view taken along the IV-IV line in FIG. 5.

FIG. 4 to FIG. 6 show a steering column device 1A according to a second embodiment of the present invention. In the drawings, the same constituents as those in the first embodiment are designated with the same reference numerals and duplicate description will be omitted herein.

As shown in FIG. 4 to FIG. 6, a key difference of the steering column device 1A of this embodiment from the steering column device 1 of the first embodiment is that the position of formation of the anteroposterior protrusion 12 is shifted to an upper end of the movable longitudinal wall portion 33 located above the center line C1 passing through the center of the clamp bolt 7.

Specifically, in this embodiment, the paired vertical protrusions 10 and 11 being separately disposed in the axial direction (the direction of the telescopic operation) of the steering column 3 while interposing the clamp bolt 7 therebetween and extending in the direction of the tilt operation (the vertical direction in FIG. 5) are provided on the fixed longitudinal wall portion 41 out of the fixed longitudinal wall portion 41 and the movable longitudinal wall portion. Meanwhile, the paired anteroposterior protrusions 12 and 13 being separately disposed in the direction of the tilt operation while interposing the clamp bolt 7 therebetween and extending in the axial direction (the direction of the telescopic operation) of the steering column 3 are provided on the movable longitudinal wall portion 33. Hence the clamp bolt 7 is located in the center of the contact portions 14 in four positions on the fixed longitudinal wall portion 41 and the movable longitudinal wall portion 33.

This embodiment can also exert similar effects to the first embodiment.

According to this embodiment, since the clamp bolt 7 is located in the center of the contact portions 14 in the four positions, it is possible to apply the clamping force from the clamp bolt 7 substantially evenly to the respective contact portions 14. Hence it is possible to obtain sufficient support stiffness of the steering column 3, to achieve more stable fixation, to improve and to further stabilize the resonance frequency upon resonance of the steering wheel with the vehicle body, and to suppress the resonance of the steering wheel.

Third Embodiment

Figure 7:
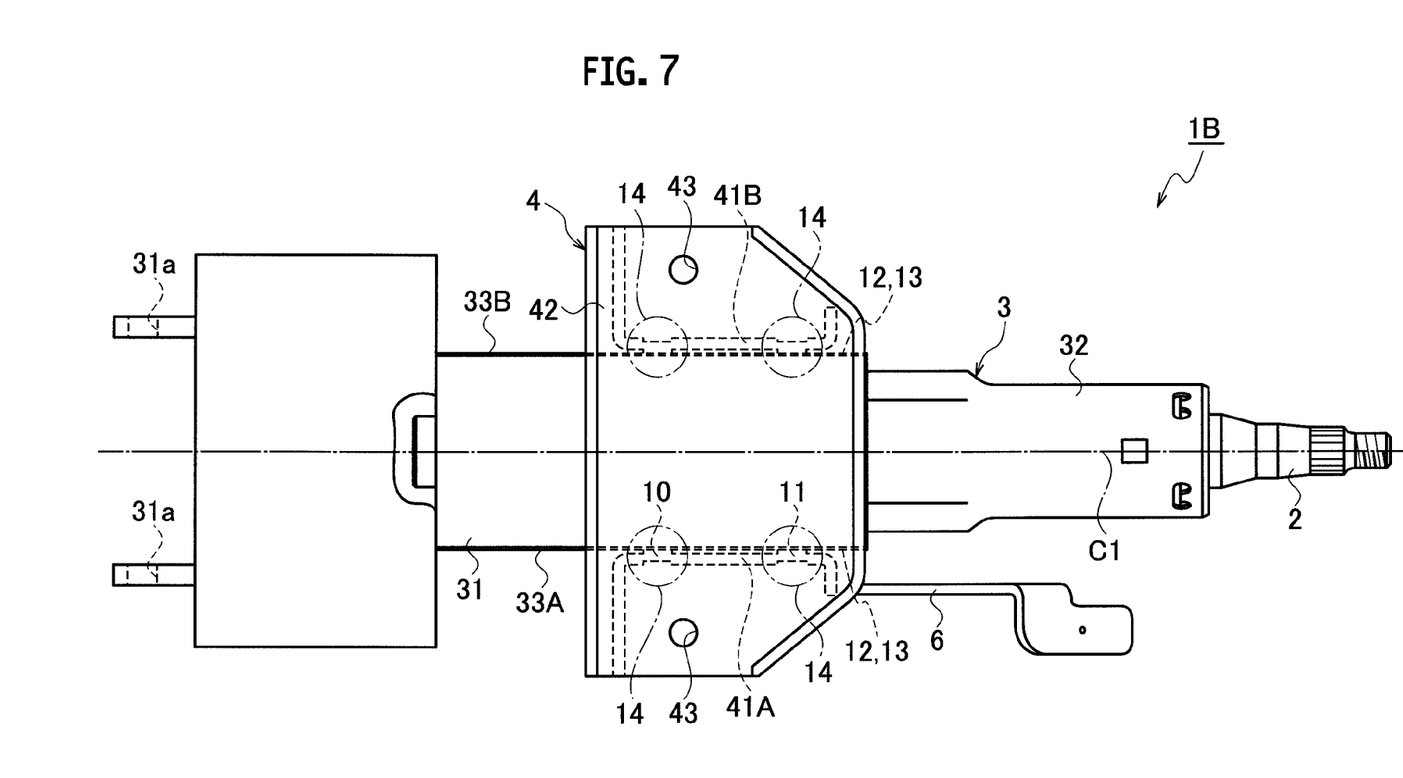
FIG. 7 is a plan view of a steering column device according to a third embodiment of the present invention.
Figure 8:
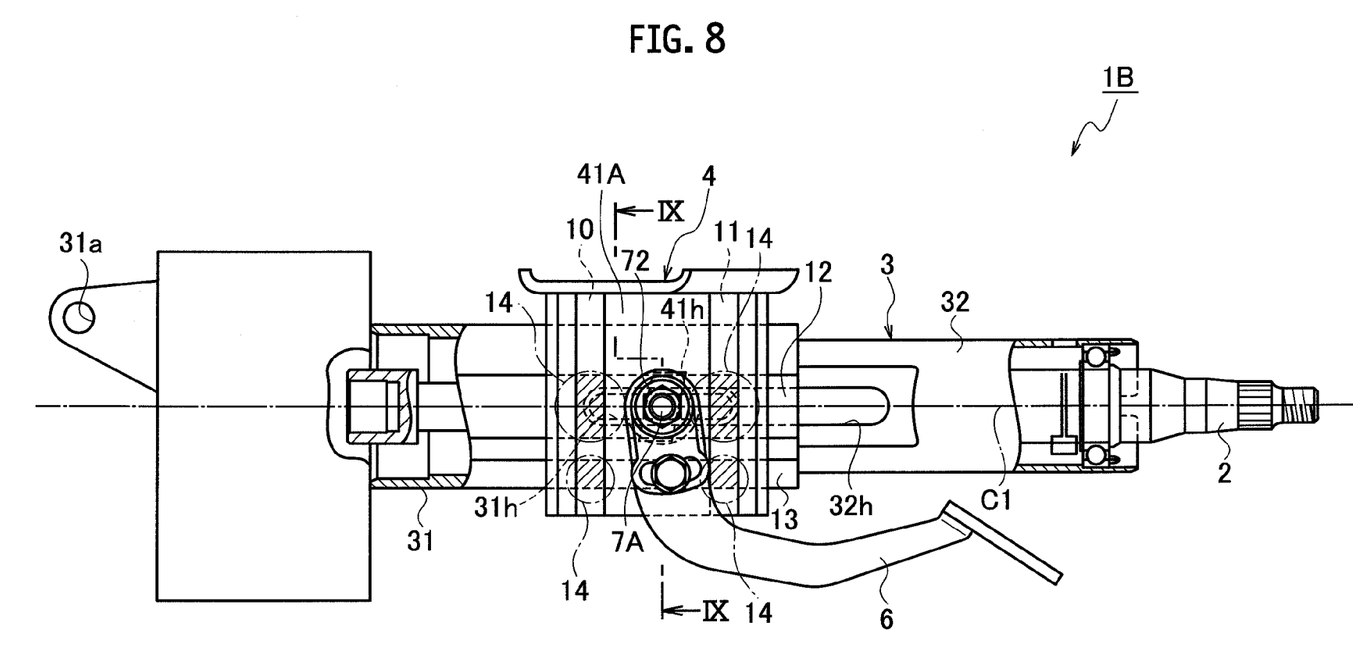
FIG. 8 is a side view of the steering column device according to the third embodiment of the present invention.
Figure 9:
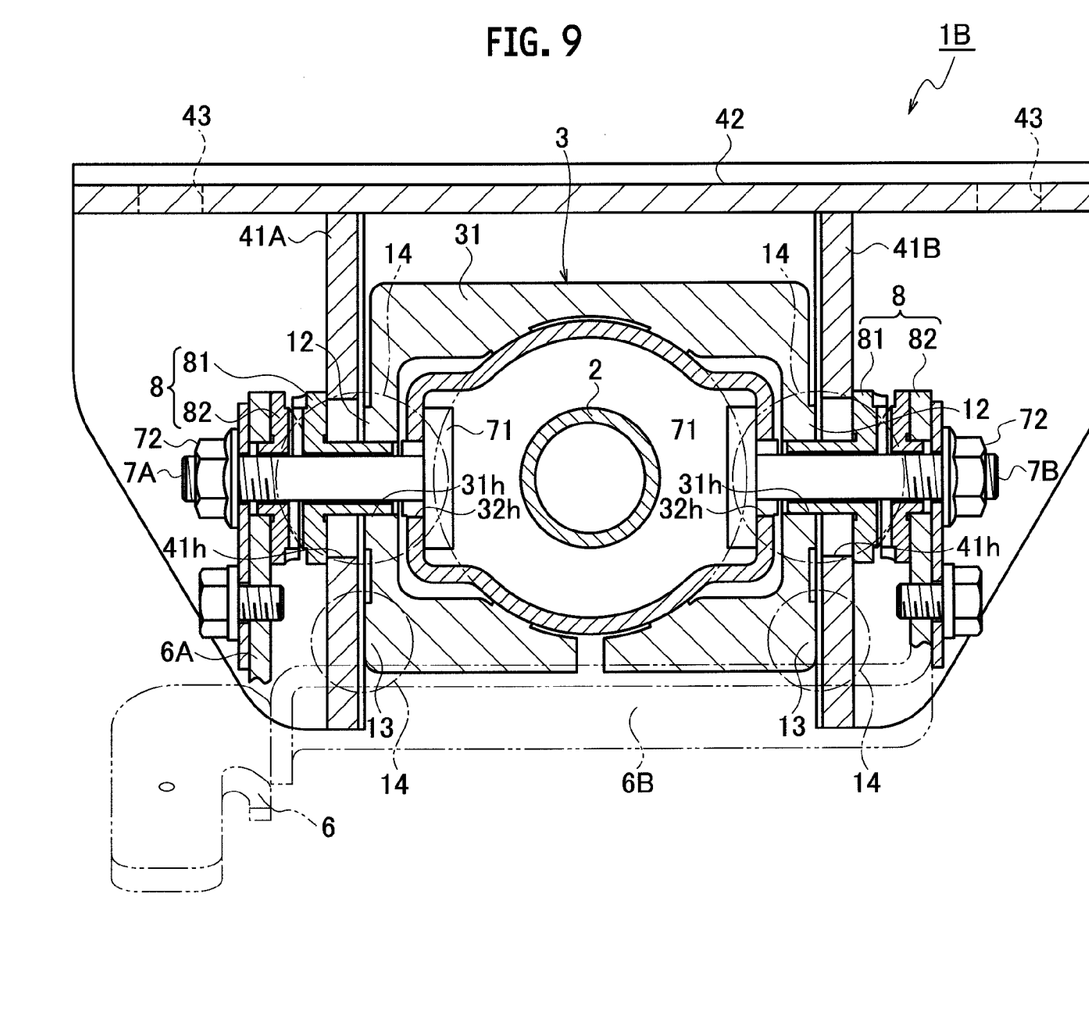
FIG. 9 is a cross-sectional view taken along the IX-IX line in FIG. 8.

FIG. 7 to FIG. 9 show a steering column device 1B according to a third embodiment of the present invention. In the drawings, the same constituents as those in the first embodiment are designated with the same reference numerals and duplicate description will be omitted herein.

As shown in FIG. 7 to FIG. 9, a key difference of the steering column device 1B of this embodiment from the steering column device 1 of the first embodiment is that fixed longitudinal wall portions 41A and 41B and movable longitudinal wall portions 33A and 33B are respectively provided on both of right and left sides of the steering column 3 so as to establish a both-end support type.

Specifically, in this embodiment, the vehicle-body-side bracket 4 is substantially formed by disposing the fixed longitudinal wall portions 41A and 41B respectively on both of the right and left sides of the steering column 3, and fixing the upper side plate 42 having an inverted U-shaped cross section to upper ends of both of the fixed longitudinal wall portions 41A and 41B. Further, as similar to the first embodiment, the vehicle-body-side bracket 4 is fixed to the steering member through the fixation holes 43 provided on both ends in the vehicle width direction of the upper side plate 42 by use of bolts and the like.

The movable longitudinal wall portions 33A and 33B formed on the lower jacket 31 are disposed on inner surfaces of the fixed longitudinal wall portions 41A and 41B, respectively. The upper jacket 32 is slidably supported by the upper jacket 32.

The vertically elongated holes 41h are formed respectively on the right and left fixed longitudinal wall portions 41A and 41B. Moreover, the anteroposteriorly elongated holes 32h are formed respectively on the right and left movable longitudinal wall portions 33A and 33B. Here, paired right and left clamp bolts 7A and 7B are provided. The clamp bolt 7A is inserted to the vertically elongated hole 41h and the anteroposteriorly elongated hole 32h provided on the fixed longitudinal wall portion 41A and the movable longitudinal wall portion 33A on the left side. Meanwhile, the clamp bolt 7B is inserted to the vertically elongated hole 41h and the anteroposteriorly elongated hole 32h provided on the fixed longitudinal wall portion 41B and the movable longitudinal wall portion 33B on the right side.

Each of the right and left clamp bolts 7A and 7B is provided with the cam portion 8 which includes the fixed cam member 81 and the movable cam member 82. Moreover, the operation lever 6 is provided with fitting portions 6A and 6B in a fork shape which are disposed outside the fixed longitudinal wall portions 41A and 41B. The fitting portion 6A is engaged with one of the movable cam members 82 in the noncircular fashion, while the fitting portion 6B is engaged with the other movable cam member 82 in the noncircular fashion. Hence both of the clamp bolts 7A and 7B are configured to generate clamping forces at the same time through the cam portions 8 by operating the operation lever 6.

Paired vertical protrusions 10 and 11 being separately disposed in the axial direction (the direction of the telescopic operation) of the steering column 3 and extending in the direction of the tilt operation (the vertical direction in FIG. 7) are provided on each of the right and left fixed longitudinal wall portions 41A and 41B. Meanwhile, paired anteroposterior protrusions 12 and 13 being separately disposed in the direction of the tilt operation and extending in the axial direction (the direction of the telescopic operation) of the steering column 3 are provided on each of the right and left movable longitudinal wall portions 33A and 33B.

At this time, as similar to the first embodiment, the anteroposterior protrusion 12 is disposed on the center line C1 passing through the centers of the clamp bolts 7A and 7B and extending in the axial direction of the steering column 3, and the anteroposterior protrusion 13 is located in a position equivalent to a position where the anteroposterior protrusion 12 moves downward in a perpendicular direction relative to the center line C1.

The clamp bolts 7A and 7B cannot move in the axial direction in the clamped state due to the upper jacket 32. Accordingly, the fixed longitudinal wall portions 41A and 41B are bent so as to come close to each other and establish pressure contact with the movable longitudinal wall portions 33A and 33B. Furthermore, the movable longitudinal wall portions 33A and 33B are bent inward so as to establish pressure contact with the upper jacket 32, thereby preventing relative movement.

This embodiment can also exert similar effects to the first embodiment.

Since this embodiment applies the both-end support type by providing the fixed longitudinal wall portions 41A and 41B and the movable longitudinal wall portions 33A and 33B respectively on both of right and left sides of the steering column 3. Accordingly, it is possible to further enhance support stiffness of the steering column 3 and thereby to improve and further stabilize the resonance frequency.

Fourth Embodiment

Figure 10:
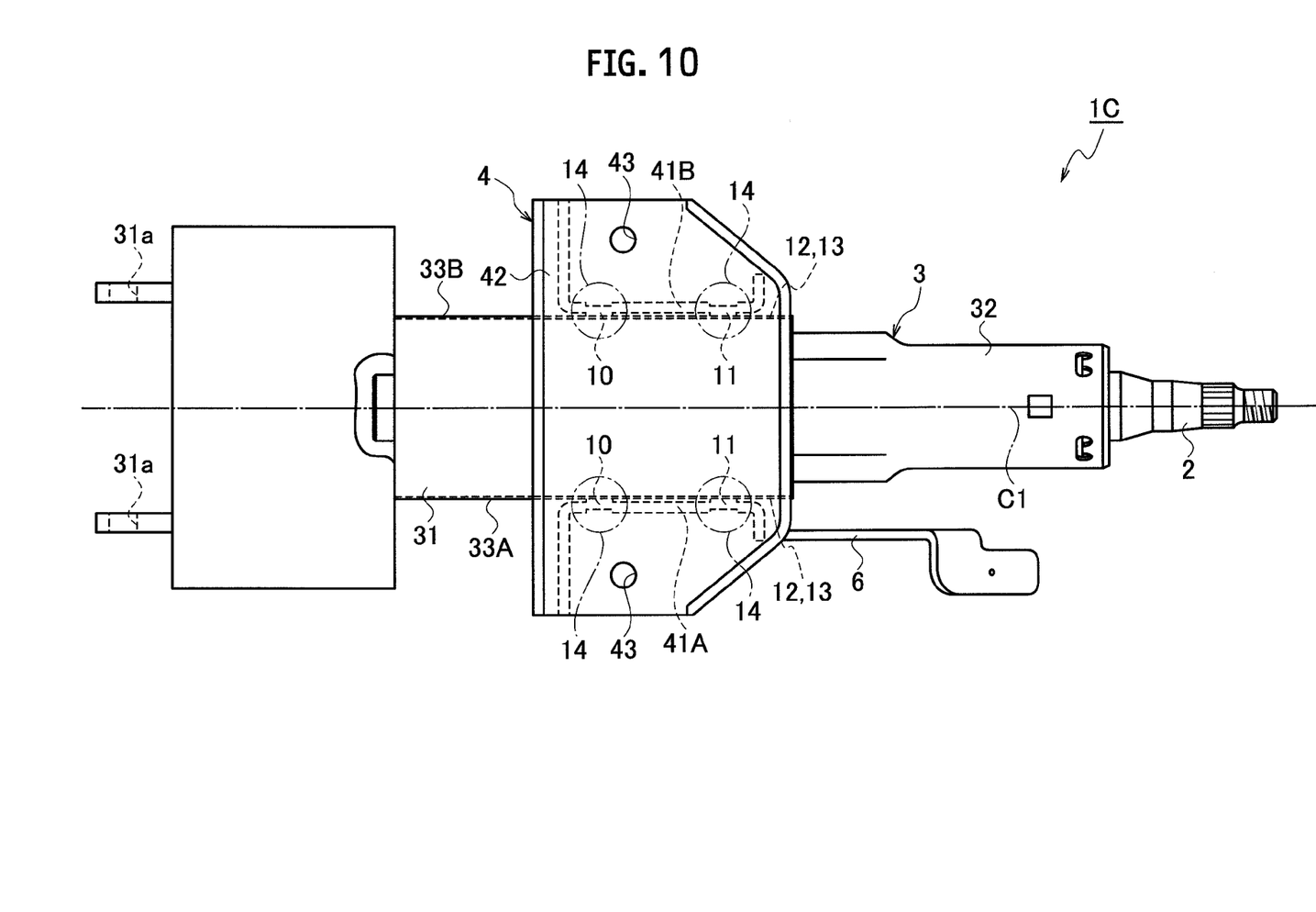
FIG. 10 is a plan view of a steering column device according to a fourth embodiment of the present invention.
Figure 11:
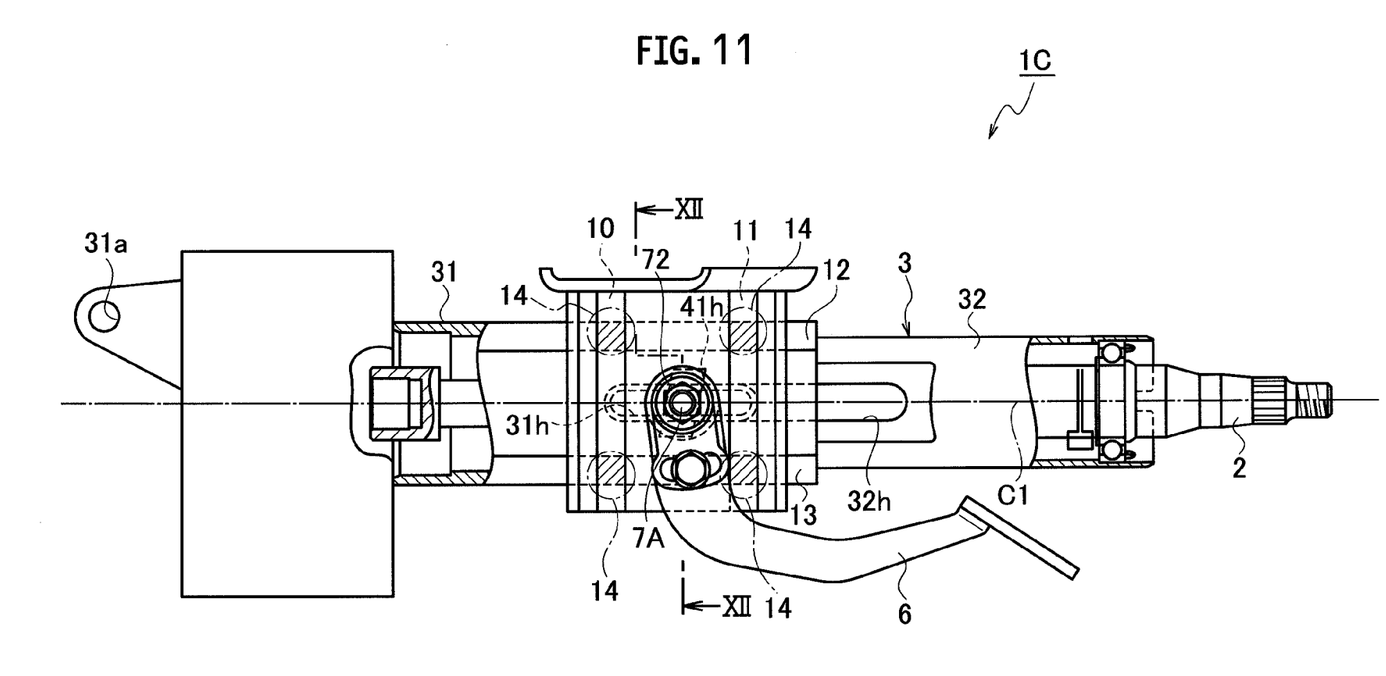
FIG. 11 is a side view of the steering column device according to the fourth embodiment of the present invention.
Figure 12:
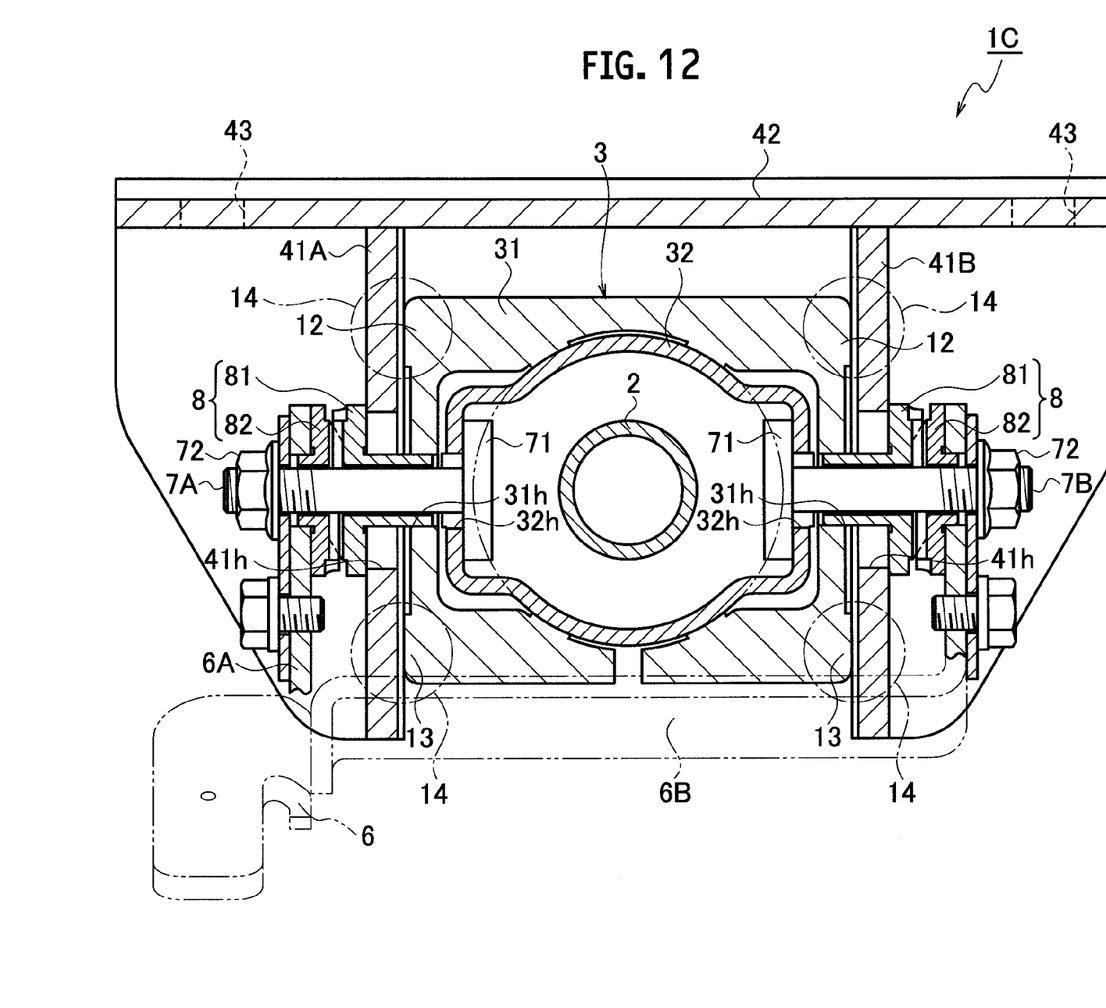
FIG. 12 is a cross-sectional view taken along the XII-XII line in FIG. 11.

FIG. 10 to FIG. 12 show a steering column device 1C according to a fourth embodiment of the present invention. In the drawings, the same constituents as those in the third embodiment are designated with the same reference numerals and duplicate description will be omitted herein.

As shown in FIG. 10 to FIG. 12, a key difference of the steering column device 1C of this embodiment from the steering column device 1B of the third embodiment is that, similarly to the second embodiment, the position of formation of the anteroposterior protrusion 12 is shifted to an upper end of the movable longitudinal wall portion 33A and 33B located above the center line C1 passing through the center of the clamp bolt 7A and 7B and the clamp bolts 7A and 7B are located in the center of the contact portions 14 located in four positions.

This embodiment can also exert similar effects to the third embodiment.

According to this embodiment, since the clamp bolts 7A and 7B are located in the center of the contact portions 14 located in four positions, it is possible to apply clamping forces from the clamp bolts 7A and 7B substantially evenly to the contact portions 14. Hence it is possible to obtain sufficient support stiffness of the steering column 3, to achieve more stable fixation, and to improve and to further stabilize the resonance frequency upon resonance of the steering wheel with the vehicle body.

Although the steering column device of the present invention has been described based on the first to fourth embodiments as examples, it is to be noted that the present invention is not limited only to these embodiments and various other embodiments may also be applicable without departing from the scope of the present invention.

For example, the first to fourth embodiments are applied to the steering column device provided with both of a function to adjust a tilt position and a function to adjust a telescopic position. However, the present invention is also applicable to a steering column device which adopts any of the function to adjust the tilt position, the function to adjust the telescopic position, and none of these functions by forming any one of or both of the vertically elongated hole and the anteroposteriorly elongated hole into a round hole. In this case as well, it is possible to achieve similar operations and effects to any of the embodiments.

What is claimed is:

1. A steering column device comprising:
a bracket including a fixed portion to be fixed to a vehicle body and a first wall extending downward from the fixed portion;
a steering shaft having an upper end in an axial direction of the steering shaft for fixing a steering wheel;
a steering column including one end supported by the vehicle body and an outer peripheral surface with a second wall, and configured to rotatably support the steering shaft inside the steering column;
a clamp shaft penetrating the first wall, the clamp shaft being configured to switch between a pressure contact state where the first wall and the second wall are in pressure contact with each other and a non-pressure contact state where the first wall and the second wall are not in pressure contact with each other;
two first protrusions disposed on one of the first wall or the second wall separately in a first direction parallel to an axial direction of the steering column and extending in a second direction perpendicular to the axial direction of the steering column, the two first protrusions being disposed with the clamp shaft between the two first protrusions; and
two second protrusions disposed on the other one of the first wall or the second wall separately in the second direction and extending in the first direction,
wherein each of the two first protrusions contacts both of the two second protrusions in the pressure contact state.

2. The steering column device according to claim 1, wherein
the first, wall has a first elongated hole formed between the two first protrusions along a direction of tilt movement of the steering shaft,
part of the clamp shaft is located in the first elongated hole, and
the clamp shaft is adapted to move inside the first elongated hole in the non-pressure contact state.

3. The steering column device according to claim 2, wherein
the steering column comprises:
an upper jacket configured to rotatably support the steering shaft inside a cylindrical inner portion of the upper jacket and including a second elongated hole formed along a direction of telescopic movement of the steering shaft in a region opposed to the first elongated hole; and
a lower jacket configured to slidably support the upper jacket in the direction of telescopic movement of the steering shaft and to rotatably support the steering shaft together with the upper jacket,
part of the clamp shaft is located in the second elongated hole, the clamp shaft is configured to penetrate the first wall and the second wall, adapted to move inside the second elongated hole in the non-pressure contact state, and configured to bring the first wall, the second wall, and the upper jacket into pressure contact with one another in the pressure contact state.

4. The steering column device according to claim 1, wherein the two first protrusions and the two second protrusions are in contact with each other at four contact portions in the pressure contact state, and
wherein two contact portions out of the four contact portions are located on a line parallel to an axial center line of the steering column while passing through an axial center of the clamp shaft.

5. The steering column device according to claim 1, wherein the two first protrusions and the two second protrusions are in contact with each other at four contact portions in the pressure contact state, and
wherein the clamp shaft is located at a center of the four contact portions.

* * * * *